United States Patent
Berry

(10) Patent No.: US 11,301,722 B2
(45) Date of Patent: Apr. 12, 2022

(54) METHOD, APPARATUS, AND SYSTEM FOR PROVIDING MAP EMBEDDING ANALYTICS

(71) Applicant: HERE GLOBAL B.V., Eindhoven (NL)

(72) Inventor: Tessa Berry, Naperville, IL (US)

(73) Assignee: HERE Global B.V., Eindhoven (NL)

(*) Notice: Subject to any disclaimer, the term of this patent is extended or adjusted under 35 U.S.C. 154(b) by 30 days.

(21) Appl. No.: 16/412,112

(22) Filed: May 14, 2019

(65) Prior Publication Data

US 2020/0364507 A1 Nov. 19, 2020

(51) Int. Cl.
| | |
|---|---|
| G06K 9/62 | (2006.01) |
| G06K 9/00 | (2006.01) |
| G06N 3/08 | (2006.01) |
| G06F 16/29 | (2019.01) |
| G06N 3/04 | (2006.01) |

(52) U.S. Cl.
CPC ........... *G06K 9/6262* (2013.01); *G06F 16/29* (2019.01); *G06K 9/00791* (2013.01); *G06K 9/6256* (2013.01); *G06N 3/0454* (2013.01); *G06N 3/08* (2013.01)

(58) Field of Classification Search
None
See application file for complete search history.

(56) References Cited

U.S. PATENT DOCUMENTS

| | | |
|---|---|---|
| 9,760,806 B1 | 9/2017 | Ning et al. |
| 9,811,756 B2 | 11/2017 | Liu et al. |
| 9,916,522 B2 | 3/2018 | Ros Sanchez et al. |
| 2017/0206435 A1 | 7/2017 | Jin et al. |
| 2020/0202145 A1* | 6/2020 | Mao ............... G05D 1/0221 |

OTHER PUBLICATIONS

Spruyt, Vincent. "Loc2Vec: Learning location embeddings with triplet-loss networks." (2018). (Year: 2018).*
Yao, Huaxiu, et al. "Deep multi-view spatial-temporal network for taxi demand prediction." arXiv preprint arXiv:1802.08714 (2018). (Year: 2018).*
Ding, Daizong, et al. "Geographical feature extraction for entities in location-based social networks." Proceedings of the 2018 World Wide Web Conference. 2018. (Year: 2018).*
Spruyt, "Loc2vec: Learning Location Embeddings with Triplet-loss Networks", May 3, 2018, retrieved on May 7, 2019 from https://www.sentiance.com/2018/05/03/venue-mapping/, pp. 1-3.
"Robosat", retrieved on May 7, 2019 from https://github.com/mapbox/robosat, pp. 1-7.

* cited by examiner

*Primary Examiner* — Vu Le
*Assistant Examiner* — Tracy Mangialaschi
(74) *Attorney, Agent, or Firm* — Ditthavong, Steiner & Mlotkowski

(57) ABSTRACT

An approach is provided for map embedded analytics. The approach, for instance, involves processing map data to extract one or more map features. The approach also involves training a first neural network to predict an embedding layer. The neural network is trained using the one or more extracted map features. The approach further involves generating the embedding layer using the first neural network. The embedding layer represents a semantic relationship among the one or more map features. The approach further involves providing the embedding layer as an output for embedding into a second neural network.

20 Claims, 10 Drawing Sheets

METHOD, APPARATUS, AND SYSTEM FOR PROVIDING MAP EMBEDDING ANALYTICS

BACKGROUND

Deep learning (e.g., via neural networks or equivalent machine learning models) has been used to improve a broad range of map and navigation services. However, service providers continue to face significant technical challenges to make machine learning more resource efficient and accurate for mapping or other location-based applications.

Some Example Embodiments

Therefore, there is a need for providing map embedding analytics for neural networks to improve, for instance, map feature classification.

According to one embodiment, a method comprises processing map data to extract one or more map features. The method also comprises training a first neural network to predict an embedding layer, wherein the neural network is trained using the one or more extracted map features. The method further comprises generating the embedding layer using the first neural network, wherein the embedding layer represents a semantic relationship among the one or more map features. The method further comprises providing the embedding layer as an output for use by a second neural network.

According to another embodiment, an apparatus comprises at least one processor, and at least one memory including computer program code for one or more computer programs, the at least one memory and the computer program code configured to, with the at least one processor, cause, at least in part, the apparatus to process map data to extract one or more map features. The apparatus is also caused to train a first neural network to predict an embedding layer, wherein the neural network is trained using the one or more extracted map features. The apparatus is further caused to generate the embedding layer using the first neural network, wherein the embedding layer represents a semantic relationship among the one or more map features. The apparatus is further caused to provide the embedding layer as an output for use by a second neural network.

According to another embodiment, a non-transitory computer-readable storage medium carries one or more sequences of one or more instructions which, when executed by one or more processors, cause, at least in part, an apparatus to process map data to extract one or more map features. The apparatus is also caused to train a first neural network to predict an embedding layer, wherein the neural network is trained using the one or more extracted map features. The apparatus is further caused to generate the embedding layer using the first neural network, wherein the embedding layer represents a semantic relationship among the one or more map features. The apparatus is further caused to provide the embedding layer as an output for use by a second neural network.

According to another embodiment, an apparatus comprises means for processing map data to extract one or more map features. The apparatus also comprises means for training a first neural network to predict an embedding layer, wherein the neural network is trained using the one or more extracted map features. The apparatus further comprises means for generating the embedding layer using the first neural network, wherein the embedding layer represents a semantic relationship among the one or more map features. The apparatus further comprises means for providing the embedding layer as an output for embedding into a second neural network.

According to another embodiment, a method comprises retrieving an embedding layer. For example, a first neural network is trained using one or more map features extracted from a geographic database to predict the embedding layer, and the embedding layer represents a semantic relationship among the one or more map features. The method also comprises inserting the embedding layer into a second neural network. The method further comprises training the second neural network to make map-related predictions after the embedding layer is inserted.

According to another embodiment, an apparatus comprises at least one processor, and at least one memory including computer program code for one or more computer programs, the at least one memory and the computer program code configured to, with the at least one processor, cause, at least in part, the apparatus to retrieve an embedding layer. For example, a first neural network is trained using one or more map features extracted from a geographic database to predict the embedding layer, and the embedding layer represents a semantic relationship among the one or more map features. The apparatus is also caused to insert the embedding layer into a second neural network. The apparatus is further caused to train the second neural network to make map-related predictions after the embedding layer is inserted.

According to another embodiment, a non-transitory computer-readable storage medium carries one or more sequences of one or more instructions which, when executed by one or more processors, cause, at least in part, an apparatus to retrieve an embedding layer. For example, a first neural network is trained using one or more map features extracted from a geographic database to predict the embedding layer, and the embedding layer represents a semantic relationship among the one or more map features. The apparatus is also caused to insert the embedding layer into a second neural network. The apparatus is further caused to train the second neural network to make map-related predictions after the embedding layer is inserted.

According to another embodiment, an apparatus comprises means for retrieving an embedding layer. For example, a first neural network is trained using one or more map features extracted from a geographic database to predict the embedding layer, and the embedding layer represents a semantic relationship among the one or more map features. The apparatus also comprises means for inserting the embedding layer into a second neural network. The apparatus further comprises means for training the second neural network to make map-related predictions after the embedding layer is inserted.

In addition, for various example embodiments of the invention, the following is applicable: a method comprising facilitating a processing of and/or processing (1) data and/or (2) information and/or (3) at least one signal, the (1) data and/or (2) information and/or (3) at least one signal based, at least in part, on (or derived at least in part from) any one or any combination of methods (or processes) disclosed in this application as relevant to any embodiment of the invention.

For various example embodiments of the invention, the following is also applicable: a method comprising facilitating access to at least one interface configured to allow access to at least one service, the at least one service configured to perform any one or any combination of network or service provider methods (or processes) disclosed in this application.

For various example embodiments of the invention, the following is also applicable: a method comprising facilitating creating and/or facilitating modifying (1) at least one device user interface element and/or (2) at least one device user interface functionality, the (1) at least one device user interface element and/or (2) at least one device user interface functionality based, at least in part, on data and/or information resulting from one or any combination of methods or processes disclosed in this application as relevant to any embodiment of the invention, and/or at least one signal resulting from one or any combination of methods (or processes) disclosed in this application as relevant to any embodiment of the invention.

For various example embodiments of the invention, the following is also applicable: a method comprising creating and/or modifying (1) at least one device user interface element and/or (2) at least one device user interface functionality, the (1) at least one device user interface element and/or (2) at least one device user interface functionality based at least in part on data and/or information resulting from one or any combination of methods (or processes) disclosed in this application as relevant to any embodiment of the invention, and/or at least one signal resulting from one or any combination of methods (or processes) disclosed in this application as relevant to any embodiment of the invention.

In various example embodiments, the methods (or processes) can be accomplished on the service provider side or on the mobile device side or in any shared way between service provider and mobile device with actions being performed on both sides.

For various example embodiments, the following is applicable: An apparatus comprising means for performing a method of the claims.

Still other aspects, features, and advantages of the invention are readily apparent from the following detailed description, simply by illustrating a number of particular embodiments and implementations, including the best mode contemplated for carrying out the invention. The invention is also capable of other and different embodiments, and its several details can be modified in various obvious respects, all without departing from the spirit and scope of the invention. Accordingly, the drawings and description are to be regarded as illustrative in nature, and not as restrictive.

BRIEF DESCRIPTION OF THE DRAWINGS

The embodiments of the invention are illustrated by way of example, and not by way of limitation, in the figures of the accompanying drawings.

DESCRIPTION OF SOME EMBODIMENTS

Examples of a method, apparatus, and computer program for providing map embedding analytics are disclosed. In the following description, for the purposes of explanation, numerous specific details are set forth in order to provide a thorough understanding of the embodiments of the invention. It is apparent, however, to one skilled in the art that the embodiments of the invention may be practiced without these specific details or with an equivalent arrangement. In other instances, well-known structures and devices are shown in block diagram form in order to avoid unnecessarily obscuring the embodiments of the invention.

Figure 1:
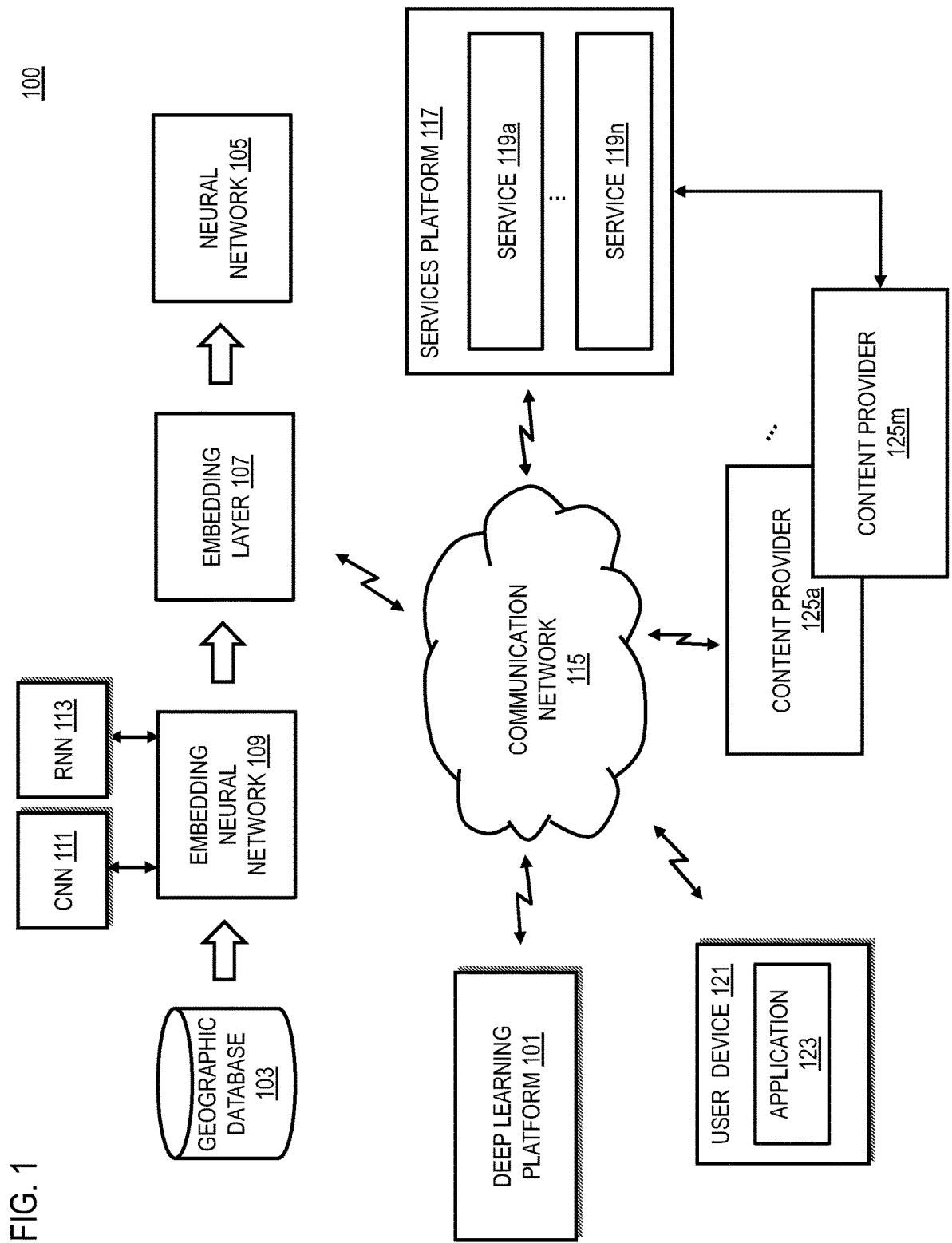
FIG. 1 is a diagram of a system capable of providing map embedding analytics, according to one embodiment.

FIG. 1 is a diagram of a system capable of providing map embedding analytics, according to one embodiment. The various embodiments described herein relate to map feature detection using deep learning (e.g., a machine learning based system such as a deep learning platform 101). Traditionally, map service providers use neural networks or equivalent machine learning models to build and add features to map data (e.g., as stored in a geographic database 103) or to improve related processes. However, deep learning is currently an emerging technology and services providers face significant technical challenges to improving the classification and analysis of map related material by neural networks or equivalent. For example, traditional approaches to training neural networks generally large amounts of training data (e.g., ground-truth labeled data) and numerous cycles of back-propagation to achieve target levels of classification accuracy and performance. This traditional model training process uses considerable computer resources (e.g., processing resources, memory resources, storage resources, bandwidth resources, etc.).

It is also resource intensive to obtain the amount training data needed to achieve performance targets. For example, one use of deep learning includes but is not limited to map feature detection in imagery (e.g., satellite or aerial imagery). To train a neural network to detect these features, service providers obtain a typically large of amount of imagery that has been annotated by human labelers to generate ground truth data. The process of manually annotating potentially thousands or tens of thousands of images can be resources intensive and slow, thereby limiting the ability to train or retrain neural networks more frequently to improve their performance and accuracy.

To address these technical challenges and issues, a system 100 of FIG. 1 introduces a technical capability to improve neural network classification of map features and/or prediction of the semantic relationship among the map features by use of semantic map embedding layers. In one embodiment, the system 100 leverages the map data already collected and stored in the geographic database 103 to train a semantic map embedding layer that can help neural networks identify and classify other map attributes and relationships. More specifically, when training a neural network 105, a special n-dimensional embedding layer 107 can be co-trained or pre-trained for incorporation into the neural network 105. In one embodiment, the embedding layer 107 and/or an embedding neural network 109 that is used to predict the embedding layer 107 can read in the map data of the geographic database 103 and store information like the semantic meaning of any map attribute or feature (e.g., roads, buildings, terrain features, etc.), the distances between the semantic meanings, relationships between the map features (e.g., like the path by which a user can navigate from a parking lot to a store front), and/or the like.

The embodiments of the system 100 as described herein could help utilize the map data (e.g., geographic database 103) that is readily available to make better predictions using neural networks. This, in turn, can advantageously reduce the amount of training data and/or computer resources that is used to train a neural network 105 that includes the embedding layer 107 versus a neural network 105 that does not include the embedding layer 107. In addition, the use of the embedding layer 107 in the neural network 105 could help remove or reduce false positives in predictions. For example, neural networks that have binary predictions (e.g., map feature detected vs map feature not detected) can leverage much more information because they have examples of other classes (e.g., other map attribute classes) provided in the embedding layer 107. In one embodiment, the embodiments of map embedding analytics described herein can help train algorithms or machine learning models that traditionally have no ability to be trained together (e.g., (e.g., a convolutional neural network (CNN) 111 and recurrent neural network (RNN) 113).

Figure 2:
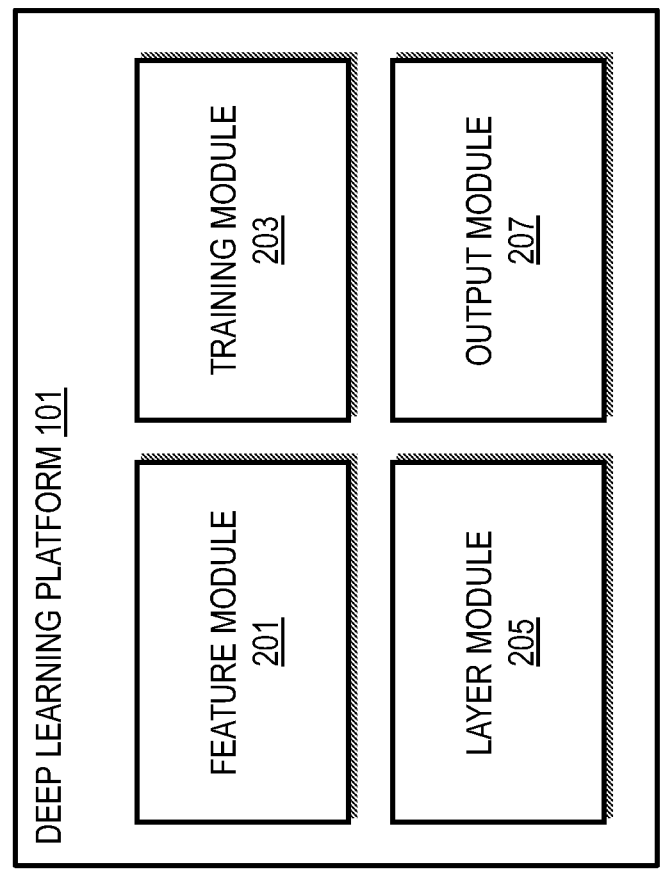
FIG. 2 is a diagram of components of a deep learning platform capable of providing map embedding analytics, according to one embodiment.

In one embodiment, the system 100 includes a deep learning platform 101 capable of providing map embedding analytics (e.g., to other components over a communication network 115) according to the embodiments described herein. As shown in FIG. 2, the deep learning platform 101 includes one or more components for generating a semantic map embedding layer, according to the various embodiments described herein. It is contemplated that the functions of these components may be combined or performed by other components of equivalent functionality. In this embodiment, the deep learning platform 101 includes a feature module 201, training module 203, layer module 205, and output module 207. The above presented modules and components of the deep learning platform 101 can be implemented in hardware, firmware, software, or a combination thereof. Though depicted as a separate entity in FIG. 1, it is contemplated that the deep learning platform 101 may be implemented as a module of any other component of the system 100 (e.g., a component of a services platform 117, services 119a-119n (also collectively referred to as services 119), user device 121, application 123 executing on the user device 121, etc.). In another embodiment, one or more of the modules 201-207 may be implemented as a cloud-based service, local service, native application, or combination thereof. The functions of the deep learning platform 101 and the modules 201-207 are discussed with respect to FIGS. 3-7 below.

Figure 3:
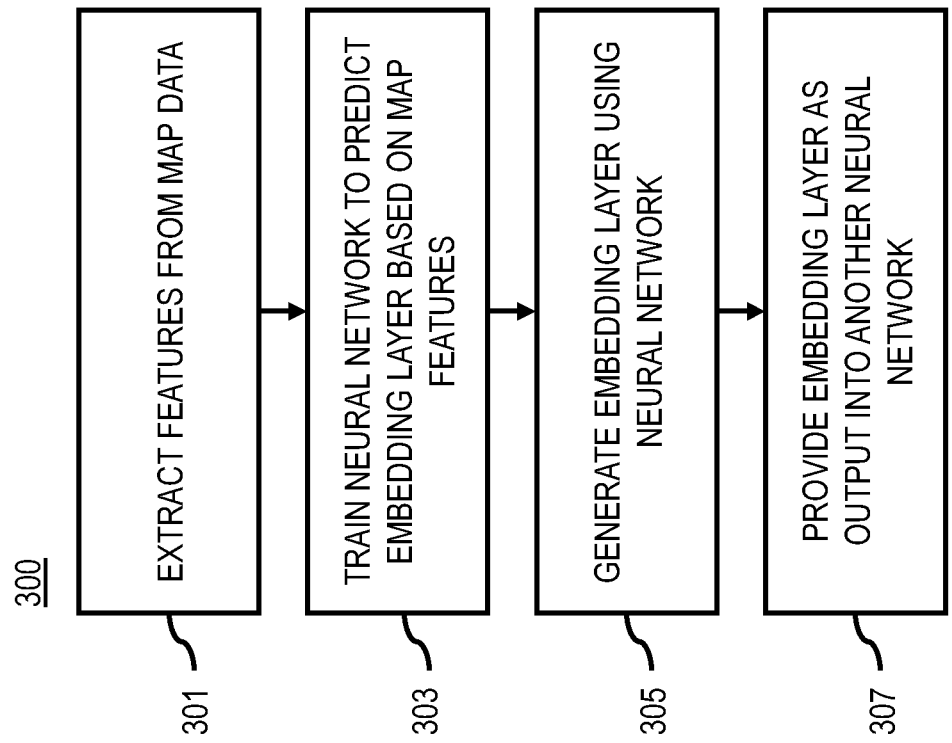
FIG. 3 is a flowchart of a process for providing a map embedding layer, according to one embodiment.
Figure 9:
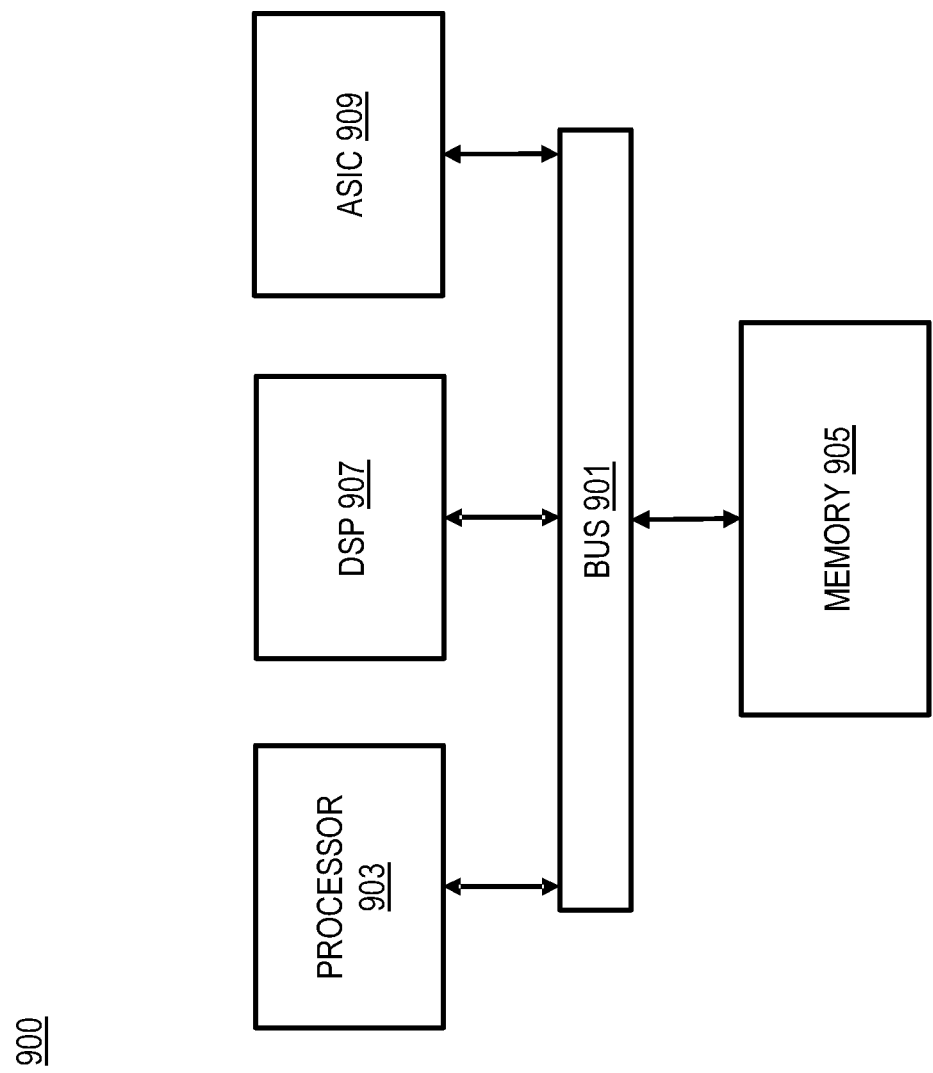
FIG. 9 is a diagram of a chip set that can be used to implement an embodiment of the processes described herein.

FIG. 3 is a flowchart of a process for providing a map embedding layer, according to one embodiment. In various embodiments, the deep learning platform 101 and/or any of the modules 201-207 of the deep learning platform 101 may perform one or more portions of the process 300 and may be implemented in, for instance, a chip set including a processor and a memory as shown in FIG. 9. As such, the deep learning platform 101 and/or the modules 201-207 can provide means for accomplishing various parts of the process 300, as well as means for accomplishing embodiments of other processes described herein in conjunction with other components of the system 100. Although the process 300 is illustrated and described as a sequence of steps, its contemplated that various embodiments of the process 300 may be performed in any order or combination and need not include all of the illustrated steps.

In one embodiment, the process 300 uses map attributes or features as an input and enables a neural network 105 to encode these attributes into a semantic embedded n-dimensional layer 107 in the neural network 105 to aid that neural network 105 in classification or analysis of map attributes/features and relationships. To initiate the process 300, in step 301, the feature module 201 processes map data to extract one or more map features. By way of example, map attributes and features can be used synonymously to refer to geographic data including but not limited to: (1) any structure, object, boundary, item, terrain feature, etc.; (2) the characteristics, properties, etc. of the structures, objects, boundaries, items, etc.; and (3) the relationships (e.g., spatial relationships, semantic relationships, physical relationships, etc.) among the structures, objects, boundaries, items, etc. For example, the one or more map features can include one or more map attribute categories such as but not limited to: (road, building, parking lot, bike path, train line, round-a-bout, intersection, park, sidewalk, houses, water etc.). In other words, map attributes, features, and/or categories can be any data that is stored or be derived from the map data of the geographic database 103. The extracted map features can then be used as ground truth or training data for generating the semantic map embedding layer 107 as described in further detail below.

In one embodiment, the feature module 201 can process or extract map features from all or a selected portion of the map data of the geographic database 103. For example, to provide a higher degree of network generalizability or a greater amount of map data for generating the semantic map embedding layer 107, all available map data in the geographic database 103 can be processed. Alternatively, the feature module 201 can queried for map data that meet specified criteria to provide for a more targeted semantic map embedding layer 107 or to advantageously reduce the amount of map data to process. For example, the feature module 201 can select map using criteria such as but not limited to any of the following examples: (1) selecting map data located within a threshold distance of urban centers, e.g., to target the semantic embedding layer 107 to map features or attributes associated with urban areas; (2) selecting map data located within a country or other political boundary, e.g., to target the semantic embedding layer to that country or political boundary; etc.

After extracting features from the map data of the geographic database 103, in one embodiment, there are at least two approaches to building the semantic map embedding layer 107 for use in the neural network 105. The process for building the map embedding layer 107 is illustrated in steps 303-307 of the process 300. Accordingly, the two steps 303-307 are discussed separately for each approach below.

In a first approach or embodiment, the deep learning platform 101 can build a pre-trained network (e.g., a first or embedding neural network 109) that predicts the map embedding layer 107. In this approach, the first or embedding neural network 109 predicts an embedding layer 107 where each map attribute category (e.g., road, building, parking lot, bike path, train line, round-a-bout, intersection, park, sidewalk, houses, water, etc.) would be represented by a different vector. For example, in step 303, map image tiles or the map features extracted from the map data (e.g., as described in step 301) could be fed into the embedding neural network 109 to train the network 109 to maximize the distance (e.g., a semantic distance) between predicted embedding vectors of various map classes or features (e.g., using a loss function to maximize the distance during training of the embedding neural network 109).

In one embodiment, the training module 203 can specify or receive an input for specifying the size of the embedding layer (e.g., the number of dimensions, number of features, etc.) and the metric by which the inputs (e.g., map data or feature extracted from the map data) are grouped by specifying the loss function over which the embedding layer 107 is optimized. By way of example, the loss function can be selected to provide a semantic grouping of the predicted map attributes in the embedding layer 107 in an n-dimensional space (e.g., corresponding to the specified size of the embedding layer 107) such that the distance between two attributes in the n-dimensional space corresponds to the semantic distance between the two features.

Figure 4:
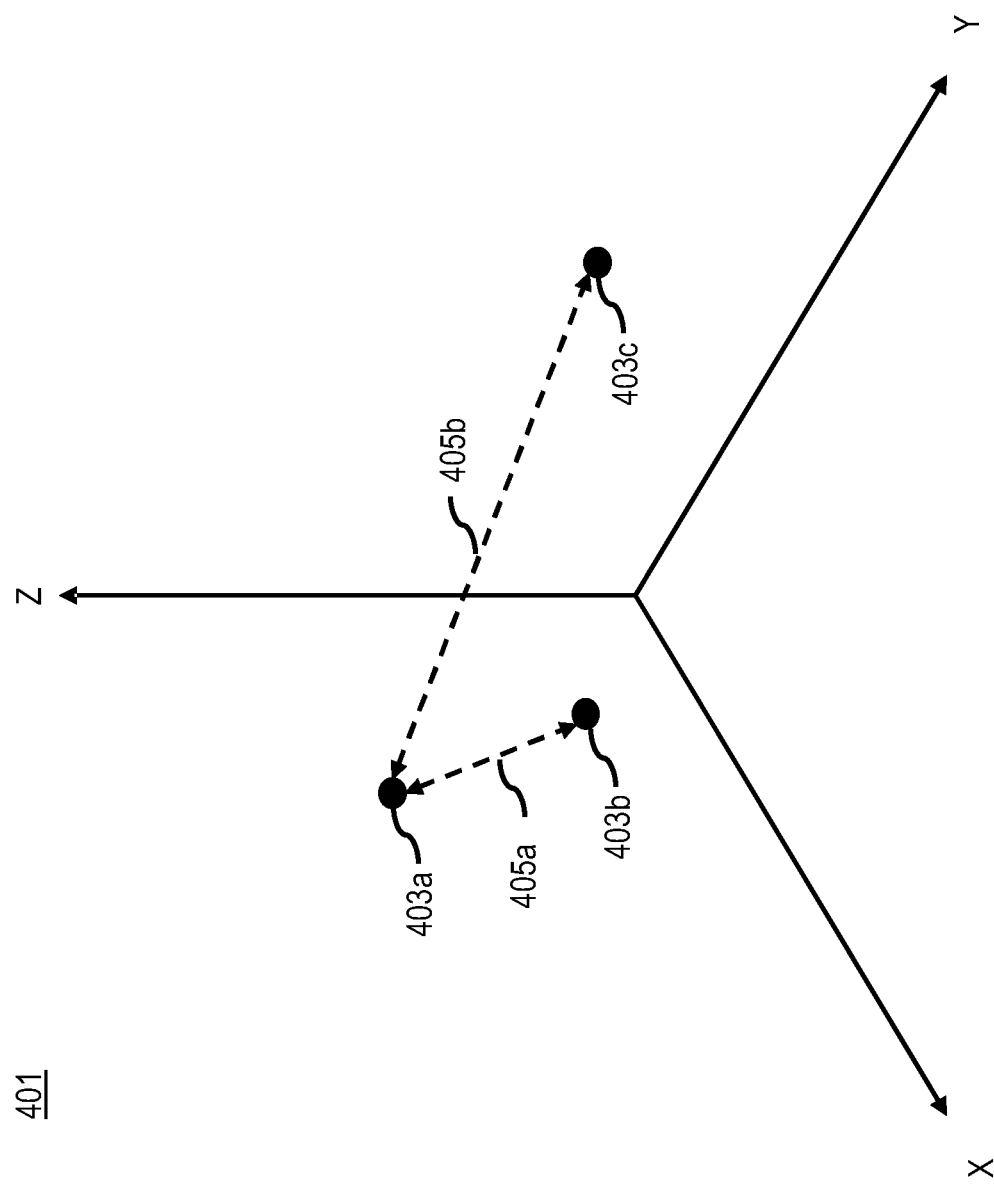
FIG. 4 is a diagram illustrating an example of semantic distance, according to one embodiment.

Semantic distance, for instance, refers to how closely related in meaning any two or more attributes. FIG. 4 is a diagram illustrating an example of semantic distance, according to one embodiment. In the example of FIG. 4, a semantic space 401 having three dimensions (e.g., X, Y, and Z corresponding to respective features) is shown. This semantic space 401 corresponds to the feature space predicted by the embedding neural network 109 based on a loss function that optimizes the distances between predicted map attributes 403*a*-403*c* according to the semantic relationships among the map attributes (e.g., as indicated in the map data used to train the embedding neural network 109). In this example, the distance 405*a* between attributes 403*a* and 403*b* is shorter than the distance 405*b* between attributes 403*a* and 403*c*. This means that attributes 403*a* and 403*b* are more semantically related than attributes 403*a* and 403*c*.

In an example where attribute 403*a* is a road, attribute 403*b* is a sidewalk, and attribute 403*c* is a lake, the semantic space 401 of the embedding layer 107 correctly represents that road 403*a* and sidewalk 403*b* (e.g., both being travel paths) are semantically closer together than road 403*a* is to lake 403*c*. In one embodiment, because this semantic data is encoded into the embedding layer 107, other neural networks 105 that incorporate the map embedding layer 107 can include at least some initial semantic data to improve predictions. For example, data on semantic distances between features, can increase the probability that the neural network 105 incorporating the embedding layer 107 will make a prediction that is semantically closer to the ground truth even when the prediction is incorrect, thereby advantageously improving neural network performance even when a prediction is incorrect.

In one embodiment, the training module 203 can incorporate a supervised learning model to train the embedding neural network 109 to predict the embedding layer 107 using the specified layer size and map features extracted from the geographic database 103 (e.g., representing ground truth data). For example, during training, the training module 203 feeds extracted map feature sets into the embedding neural network 109 to compute a predicted map embedding layer 107 using an initial set of model parameters. The training module 203 then compares the predicted embedding layer 107 to the ground truth data (e.g., map data of the geographic database 103). The training module 203, for instance, computes a loss function based on the initial set of model parameters such that the loss function optimizes the predicted semantic distances of objects in the embedding layer 107.

In one embodiment, the training module 203 incrementally adjusts the model parameters until the model maximizes the distances between dissimilar objects and/or minimizes distances between similar objects using the loss function (e.g., achieves a target maximum and/or minimum distance separation for objects). In other words, a "trained" embedding neural network 109 is a machine learning model with parameters (e.g., coefficients, weights, etc.) adjusted to make predictions of the embedding layer 107 with maximum distances between dissimilar objects and/or minimum distances between similar objects with respect to the ground truth data. In step 305, the layer module 205 then uses the trained embedding neural network 109 to predict the embedding layer 107 based on specified parameters such as but not limited to embedding layer size (e.g., number of dimensions), loss function, metric for loss function, and/or the like. The resulting embedding layer 107 would then represent the semantic relationships or distances among the map features of the geographic database 103

Once the pre-trained embedding layer is built using the first or embedding neural network 109, the output module 207 can provide the embedding layer as an output for embedding into a second neural network (step 307). By way of example, the second neural network 105 ca be trained to classify one or more map attributes, a relationship between the one or more map attributes, or a combination thereof after the embedding layer is incorporated into the second neural network. It is contemplated that the second neural network 105 can be used for any classification application that is based, at least in part, map-related attributes or features. For example, the second neural network 105 can be built to process images (e.g., satellite image, street level images, etc.) to predict both class probability maps and embedding layers. In one embodiment, the second neural network 105 can be trained (e.g., as described above with respect to the embedding neural network 109) to learn a probability map for the class, and to learn the map embeddings in the embedding layer 107 learned by the first embedding neural network 109 for different types of map objects. As previously discussed, the map embeddings could help the second neural network 109 prediction by making more sensible predictions (e.g., predictions more semantically close in distance to true values) and removing false positives. Even in cases where the map embeddings result in a false positive or incorrect prediction, the resulting incorrect prediction is likely to be semantically closer to the correct/true answer. For example, a neural network using an embedding layer created according to the embodiments described herein might mis-label a bike path as a sidewalk which is better (i.e., semantically closer) than calling it a parking lot. In this case, the system 100 can evaluate accuracy using semantic distances instead of traditional binary-based error determination (e.g., either "correct" if the prediction matches a true value or "incorrect" if it does not). It is noted that the use of map embeddings into the second neural network 105 for image processing is provided by way of illustration and not as a limitation. Accordingly, it is contemplated that the various embodiments of map embedding analytics described herein would also be applicable to any other methods or processes by which map attribute data may be passed to neural networks.

In a second approach or embodiment, instead of pre-training as described above, the deep learning platform 101 can build the semantic map embedding layer 107 while co-training neural networks for other tasks. Under this approach, a single neural network can be trained to predict the both the map embedding layer 107 and the other predictions based on the map embedding layer 107 at the same time. Returning to step 303 under this co-training approach, the training module 203 feeds the extracted map features or map data (e.g., extracted as described with respect to step 301) into the neural network 105 alongside the data needing to be analyzed. The training module 203 would train the neural network 105 to build the semantic map embedding layer 107 using jointly the map data and the input data needing to be analyzed. For example, in an image processing use case, the neural network 105 can take as an input two images at a time: (1) a map image tile provided from map data of the geographic database 103, and (2) a satellite or other source image tile that represents the same area in space as the map data image tile. The neural network 105 could then make a prediction of map objects class probability such as road, building, intersection etc. The neural network 105 would also be trained (step 303) to create a semantic map embedding layer 107 (step 305) that is a representation of the same underlying spatial tile used for the prediction of map objects class probability. In one embodiment, the training module 203 can specify a loss function that causes the map embedding layer 107 to pull together embeddings of like map objects and push apart embeddings of different map objects (e.g., with respect to distances of the map objects or features in a semantic space).

In one embodiment, another possible use for the co-training approach described above is to jointly train traditionally incongruent neural networks such as convolutional neural networks (e.g., CNN 111) and recurrent neural networks (RNN 113). For example, a convolutional neural network can consist of multiple layers of collections of one or more neurons (e.g., processing nodes of the neural network) which are configured to process input data as independent nodes. For example, with respect to image processing, the receptive fields of these collections of neurons (e.g., a receptive layer) can be configured to correspond to the area of an input image. Then each node would be responsible for making predictions based on the data contained within its respective receptive field.

In contrast to convolutional neural networks, recurrent neural networks can include connections between nodes or neurons of the network that form a directed cycle to enable dynamic temporal behavior (e.g., ability to trace a path or contour through time and/or space). To facilitate this dynamic temporal behavior, recurrent neural networks can have internal memories that can store sequential information or inputs to generate output features. It is contemplated that any type of recurrent neural network can be used with the embodiments described herein including, but not limited to: (1) a Long Short Term Memory (LSTM) recurrent neural network, and (2) Gated Recurrent Unit (GRU).

Figure 5:
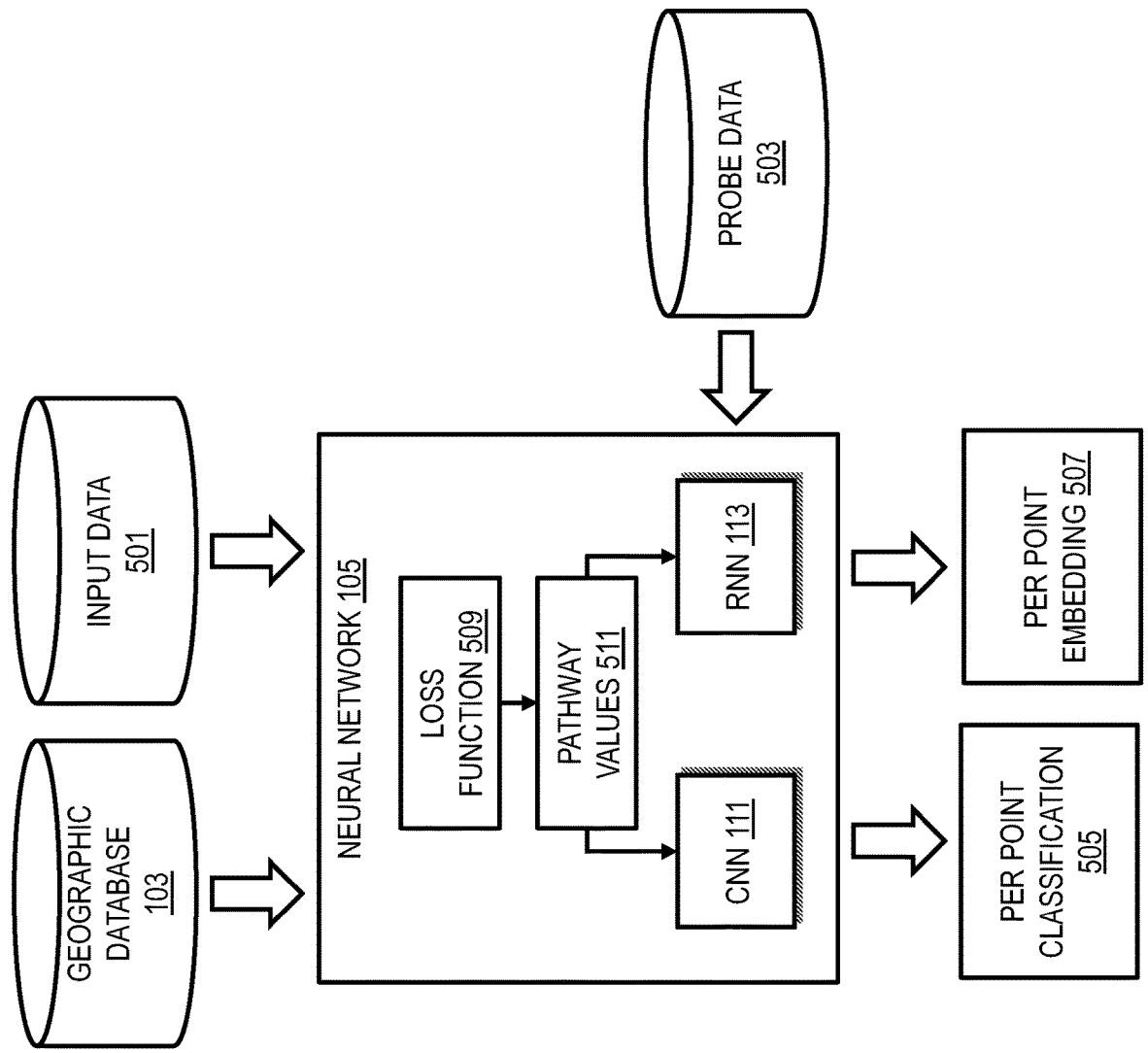
FIG. 5 is a diagram of using different neural network types to provide map embedding analytics, according to one embodiment.

In one embodiment, as shown in FIG. 5, the neural network 105 used for co-training the embedding layer 107 can conceptually be a combination of CNN 111 and RNN 113. For example, in a use case in which the deep learning platform 101 is used to distinguish types of pathways (e.g., vehicle, train, bike, and pedestrian) using probe trajectory data comprising location points sequenced by time and probe ID to represent travel trajectories or paths. The second approach detailed above could be used to co-train the two extremely different types of neural networks (e.g., CNN 111 and RNN 113). As described with in co-training approach above, the CNN 111 would process image data (e.g., input data 501 to be analyzed) and map image tiles (e.g., extracted from the geographic database 103) to create both feature probability maps and semantic embeddings. Probe data 503 labeled by probe point with the type of pathway would be fed into the RNN 113 (e.g., LSTM, GRU, or other). This combination neural network 105 would produce both a per point pathway classification 505, but it would also produce a per point embedding 507. Through the use of a penalty loss (e.g., loss function 509), the embeddings 507 predicted by the CNN 111 and RNN 113 would be forced to predict the same value per pathway type (e.g., pathway values 511). In this way, two structurally incongruent neural network types may be co-trained to produce one result.

In yet another embodiment, the feature module 201 can use the map information of the geographic database 103 to encode a multi-dimensional varied representation of a map object, feature, or attribute. For example, as discussed previously, the deep learning platform 101 can represent the idea of a map feature (e.g., a road) as a vector in a semantic embedding space. In this embodiment, each feature (e.g., a road) detected in input data (e.g., an image) for example would occupy a subspace of the semantic embedding space. Distances between roads in the semantic embedding space would be far from each other (e.g., optimized by a loss function). Then, additional attributes of the feature (e.g., addresses on the road) could be encoded as different vectors in the subspace belonging to the feature (e.g., a road). In that way, the deep learning platform 101 can encode attributes (e.g., addresses) of feature in the neural network 105. In one example use case, the attribute encoding in the subspace of the semantic embedding space can be used in applications, services, or other processes that can then relate other map features or classes (e.g., buildings, parking lots, etc.) to the feature of interest (e.g., a road) and then to a specific attribute of that feature of interest (e.g., a specific address on that road).

In one embodiment, the deep learning platform 101 can pre-train or generate the embedding layer 107 as a stand-alone product or output. For example, map service providers traditionally spend considerable resources to generate, maintain, and update a large amount of map data (e.g., stored in the geographic database 103 or equivalent). In addition to providing access to the map data itself, the map service provider can pre-process the geographic database 103 to provide the embedding layer 107 which can be then incorporated or reused across different neural networks to support a variety of machine learning applications and services.

Figure 6:
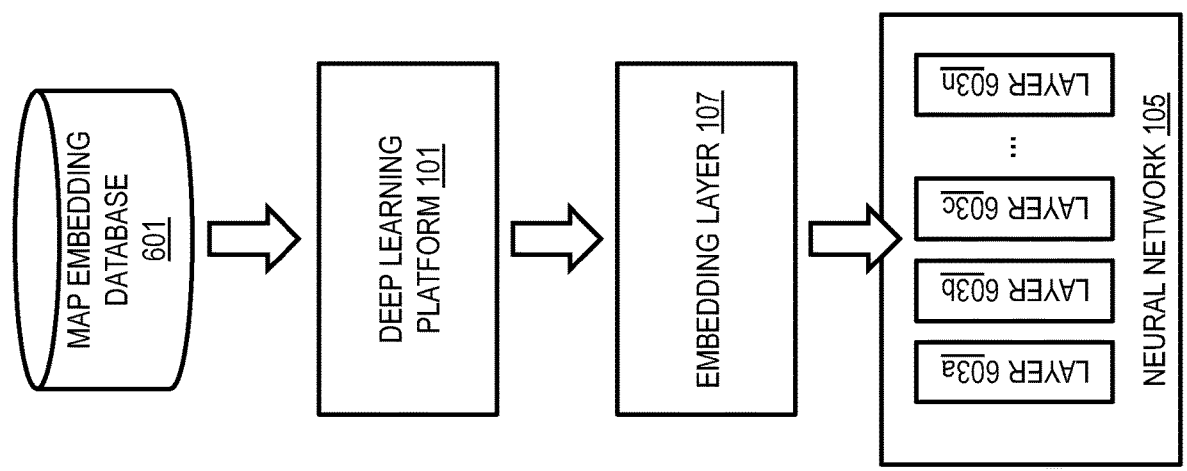
FIG. 6 is a diagram illustrating an example of incorporating a map embedding layer into a neural network, according to one embodiment.

For example, as shown in FIG. 6, the deep learning platform 101 can maintain a map embedding database 601 comprising one or more map embedding layers 107 generated from map data of the geographic database 103 according to the various embodiments described herein. The map embedding database 601, for instance, can include instances of the map embedding layer 107 generated from all map data and/or a subset of map data (e.g., as discussed above). A map embedding layer 107 can provide for high generalizability and/or feature diversity, while the subsets can be targeted based on different criteria (e.g., urban versus rural, country specific, mode of travel specific, etc.).

In response to a request, the deep learning platform 101 can provide an embedding layer 107 from the map embedding database 601 to a target neural network 105. As shown, the neural network 105 can include multiple layers 603a-603n (also collectively referred to as layers 603). The retrieved embedding layer 107 can be included in or between any of the layers 603. In one embodiment, after incorporating the embedding layer 107, the neural network 105 can be trained on data ground truth reflecting the data that is to be analyzed (e.g., image data for image processing applications). In one embodiment, the embedding layer 107 layer itself can be further trained through back propagation during training of the neural network 105. In another embodiment, the embedding layer 107 can be incorporated in the neural network 105 as a feed forward only layer so that only the relative weight of the embedding layer 107 as a whole is learned during training of the neural network 105.

As discussed above, one example but not exclusion application of neural networks with embedded map analytics includes image process for map feature or objection detection. In one embodiment, map feature detection can be performed by a computer vision system to capture or otherwise obtaining an image (e.g., rasterized images or a sequence of images, such as a video, made from pixels) depicting a map feature or object of interest. The computer vision system can then use a neural network 105 including a map embedding layer 107 (generated according to the embodiments described herein) to identify the pixels corresponding to the particular feature or object of interest. The computer vision system can use the classification output of the neural network 105 to construct polylines, polygonal boundaries, bounding boxes, etc. to represent the shape of the identified pixels corresponding to the detected map feature or object of interest.

Returning to FIG. 1, as shown, the system 100 includes the deep learning platform 101 for proving semantic map embedding layers according to the various embodiments described herein. In one embodiment, the deep learning platform 101 includes or is otherwise associated with one or more machine learning models (e.g., neural networks) for making map-related predictions or classifications using map embedding analytics (e.g., the CNN 111 for generating object feature maps from input images, and the RNN 113 for traversing probe trajectories traveling in the geographic area corresponding to the input images).

In one embodiment, the deep learning platform 101 has connectivity over the communication network 115 to the services platform 117 that provides one or more services 119 that can use neural networks with map embedding layers to perform one or more functions. By way of example, the services 119 may be third party services and include mapping services, navigation services, travel planning services, notification services, social networking services, content (e.g., audio, video, images, etc.) provisioning services, application services, storage services, contextual information determination services, location based services, information based services (e.g., weather, news, etc.), etc. In one embodiment, the services 119 uses the output of the deep learning platform 101 (e.g., neural networks with embedded map analytics.) provide services 119 such as navigation, mapping, other location-based services, etc. to the user device 121 and/or application 123 executing on the user device 121.

In one embodiment, the deep learning platform 101 may be a platform with multiple interconnected components. The deep learning platform 101 may include multiple servers, intelligent networking devices, computing devices, components and corresponding software for asymmetric evaluation of polygon similarity according to the various embodiments described herein. In addition, it is noted that the deep learning platform 101 may be a separate entity of the system 100, a part of the one or more services 119, a part of the services platform 117, or included within the user device 121.

In one embodiment, content providers 125a-125m (collectively referred to as content providers 125) may provide content or data (e.g., including geographic data, map embedding layers, etc.) to the geographic database 103, the deep learning platform 101, the services platform 117, the services 119, the user device 121, and/or the application 123 executing on the user device 121. The content provided may be any type of content, such as machine learning models, map embeddings, map content, textual content, audio content, video content, image content, etc. In one embodiment, the content providers 125 may provide content that may aid in determining polyline homogeneity according to the various embodiments described herein. In one embodiment, the content providers 125 may also store content associated with the geographic database 103, deep learning platform 101, services platform 117, services 119, user device 121, and/or any other client device of the deep learning platform 101. In another embodiment, the content providers 125 may manage access to a central repository of data, and offer a consistent, standard interface to data, such as a repository of the geographic database 103.

In one embodiment, the user device 121 may execute software application 123 to detect map features/objects and/or make map-related predictions using map embedding analytics according the embodiments described herein. By way of example, the application 123 may also be any type of application that is executable on the user device 121, such as autonomous driving applications, mapping applications, location-based service applications, navigation applications, device control applications, content provisioning services, camera/imaging application, media player applications, social networking applications, calendar applications, and the like. In one embodiment, the application 123 may act as a client for the deep learning platform 101 and perform one or more functions associated with providing map embedding analytics alone or in combination with the deep learning platform 101.

By way of example, the user device 121 is or can include any type of embedded system, mobile terminal, fixed terminal, or portable terminal including a built-in navigation system, a personal navigation device, mobile handset, station, unit, device, multimedia computer, multimedia tablet, Internet node, communicator, desktop computer, laptop computer, notebook computer, netbook computer, tablet computer, personal communication system (PCS) device, personal digital assistants (PDAs), audio/video player, digital camera/camcorder, positioning device, fitness device, television receiver, radio broadcast receiver, electronic book device, game device, or any combination thereof, including the accessories and peripherals of these devices, or any combination thereof. It is also contemplated that the user device 121 can support any type of interface to the user (such as "wearable" circuitry, etc.). In one embodiment, the user device 121 may be associated with or be a component of a vehicle or any other device.

In one embodiment, the user devices 121 are configured with various sensors for generating or collecting environmental image data (e.g., for processing by the deep learning platform 101), related geographic data, etc. In one embodiment, the sensed data represent sensor data associated with a geographic location or coordinates at which the sensor data was collected, and the polyline or polygonal representations of detected objects of interest derived therefrom. By way of example, the sensors may include a global positioning sensor for gathering location data (e.g., GPS), IMUs, a network detection sensor for detecting wireless signals or receivers for different short-range communications (e.g., Bluetooth, Wi-Fi, Li-Fi, near field communication (NFC) etc.), temporal information sensors, a camera/imaging sensor for gathering image data (e.g., the camera sensors may automatically capture road sign information, images of road obstructions, etc. for analysis), an audio recorder for gathering audio data, velocity sensors mounted on steering wheels of the vehicles, switch sensors for determining whether one or more vehicle switches are engaged, and the like.

Other examples of sensors of the user device 121 may include light sensors, orientation sensors augmented with height sensors and acceleration sensor, tilt sensors to detect the degree of incline or decline (e.g., slope) along a path of travel, moisture sensors, pressure sensors, etc. In a further example embodiment, sensors about the perimeter of the user device 121 may detect the relative distance of the device or vehicle from a lane or roadway, the presence of other vehicles, pedestrians, traffic lights, potholes and any other objects, or a combination thereof. In one scenario, the sensors may detect weather data, traffic information, or a combination thereof. In one embodiment, the user device 121 may include GPS or other satellite-based receivers to obtain geographic coordinates from positioning satellites for determining current location and time. Further, the location can be determined by visual odometry, triangulation systems such as A-GPS, Cell of Origin, or other location extrapolation technologies.

In one embodiment, the communication network 115 of system 100 includes one or more networks such as a data network, a wireless network, a telephony network, or any combination thereof. It is contemplated that the data network may be any local area network (LAN), metropolitan area network (MAN), wide area network (WAN), a public data network (e.g., the Internet), short range wireless network, or any other suitable packet-switched network, such as a commercially owned, proprietary packet-switched network, e.g., a proprietary cable or fiber-optic network, and the like, or any combination thereof. In addition, the wireless network may be, for example, a cellular network and may employ various technologies including enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., worldwide interoperability for microwave access (WiMAX), Long Term Evolution (LTE) networks, code division multiple access (CDMA), wideband code division multiple access (WCDMA), wireless fidelity (Wi-Fi), wireless LAN (WLAN), Bluetooth®, Internet Protocol (IP) data casting, satellite, mobile ad-hoc network (MANET), and the like, or any combination thereof.

By way of example, the deep learning platform 101, services platform 117, services 119, user device 121, and/or content providers 125 communicate with each other and other components of the system 100 using well known, new or still developing protocols. In this context, a protocol includes a set of rules defining how the network nodes within the communication network 115 interact with each other based on information sent over the communication links. The protocols are effective at different layers of operation within each node, from generating and receiving physical signals of various types, to selecting a link for transferring those signals, to the format of information indicated by those signals, to identifying which software application executing on a computer system sends or receives the information. The conceptually different layers of protocols for exchanging information over a network are described in the Open Systems Interconnection (OSI) Reference Model.

Communications between the network nodes are typically effected by exchanging discrete packets of data. Each packet typically comprises (1) header information associated with a particular protocol, and (2) payload information that follows the header information and contains information that may be processed independently of that particular protocol. In some protocols, the packet includes (3) trailer information following the payload and indicating the end of the payload information. The header includes information such as the source of the packet, its destination, the length of the payload, and other properties used by the protocol. Often, the data in the payload for the particular protocol includes a header and payload for a different protocol associated with a different, higher layer of the OSI Reference Model. The header for a particular protocol typically indicates a type for the next protocol contained in its payload. The higher layer protocol is said to be encapsulated in the lower layer protocol. The headers included in a packet traversing multiple heterogeneous networks, such as the Internet, typically include a physical (layer 1) header, a data-link (layer 2) header, an internetwork (layer 3) header and a transport (layer 4) header, and various application (layer 5, layer 6 and layer 7) headers as defined by the OSI Reference Model.

Figure 7:
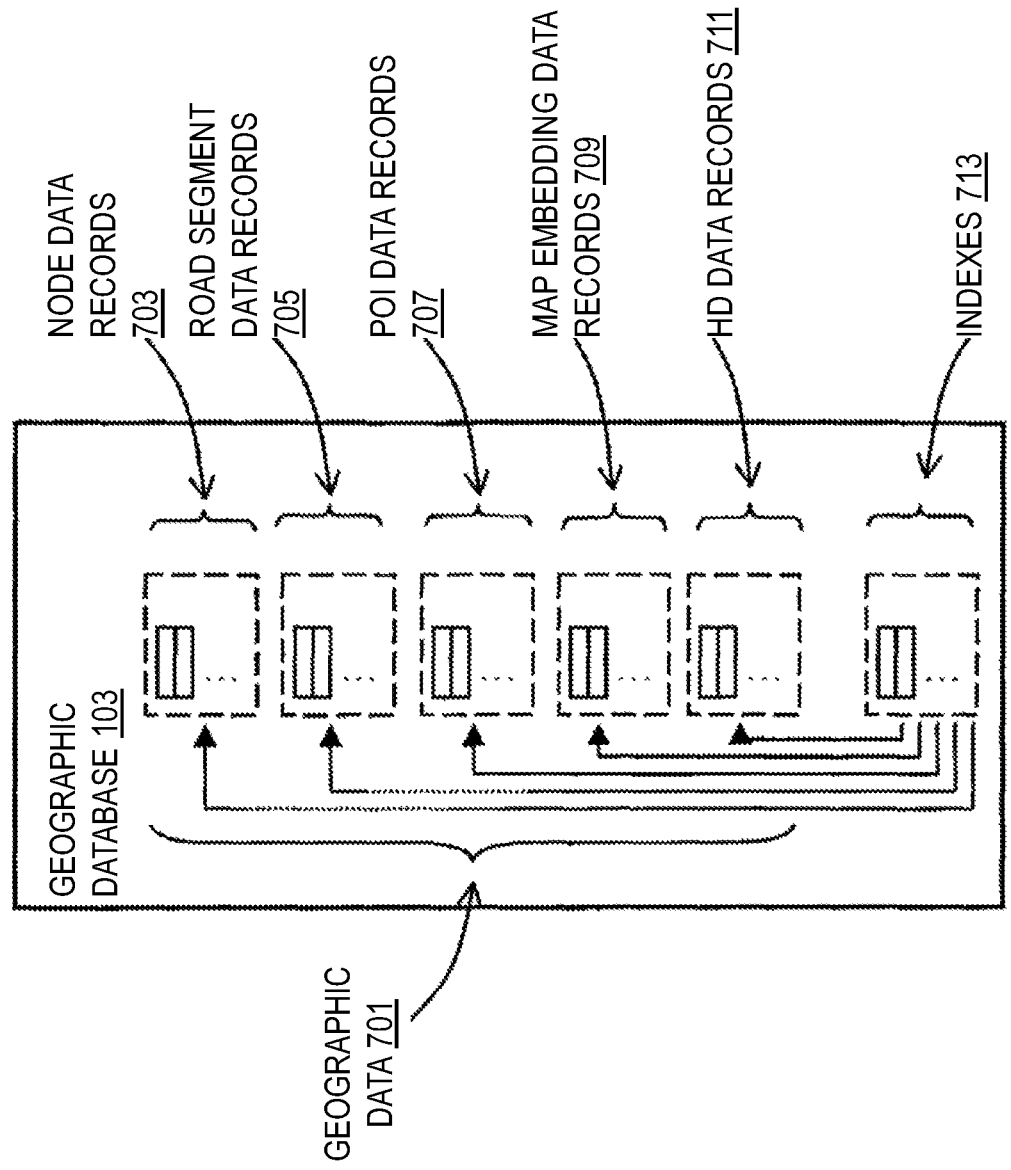
FIG. 7 is a diagram of a geographic database, according to one embodiment.

FIG. 7 is a diagram of a geographic database, according to one embodiment. In one embodiment, the geographic database 103 includes geographic data 701 used for (or configured to be compiled to be used for) mapping and/or navigation-related services, such as for providing map embedding analytics according to the embodiments described herein. For example, the map data records stored herein can be used to determine the semantic relationships among the map features, attributes, categories, etc. represented in the geographic data 701. In one embodiment, the geographic database 103 include high definition (HD) mapping data that provide centimeter-level or better accuracy of map features. For example, the geographic database 103 can be based on Light Detection and Ranging (LiDAR) or equivalent technology to collect billions of 3D points and model road surfaces and other map features down to the number lanes and their widths. In one embodiment, the HD mapping data (e.g., HD data records 711) capture and store details such as the slope and curvature of the road, lane markings, roadside objects such as sign posts, including what the signage denotes. By way of example, the HD mapping data enable highly automated vehicles to precisely localize themselves on the road.

In one embodiment, geographic features (e.g., two-dimensional or three-dimensional features) are represented using polylines and/or polygons (e.g., two-dimensional features) or polygon extrusions (e.g., three-dimensional features). In one embodiment, these polylines/polygons can also represent ground truth or reference features or objects (e.g., signs, road markings, lane lines, landmarks, etc.) used for visual odometry. For example, the polylines or polygons can correspond to the boundaries or edges of the respective geographic features. In the case of a building, a two-dimensional polygon can be used to represent a footprint of the building, and a three-dimensional polygon extrusion can be used to represent the three-dimensional surfaces of the building. Accordingly, the terms polygons and polygon extrusions as used herein can be used interchangeably.

In one embodiment, the following terminology applies to the representation of geographic features in the geographic database 103.

"Node"—A point that terminates a link.

"Line segment"—A straight line connecting two points.

"Link" (or "edge")—A contiguous, non-branching string of one or more line segments terminating in a node at each end.

"Shape point"—A point along a link between two nodes (e.g., used to alter a shape of the link without defining new nodes).

"Oriented link"—A link that has a starting node (referred to as the "reference node") and an ending node (referred to as the "non reference node").

"Simple polygon"—An interior area of an outer boundary formed by a string of oriented links that begins and ends in one node. In one embodiment, a simple polygon does not cross itself.

"Polygon"—An area bounded by an outer boundary and none or at least one interior boundary (e.g., a hole or island). In one embodiment, a polygon is constructed from one outer simple polygon and none or at least one inner simple polygon. A polygon is simple if it just consists of one simple polygon, or complex if it has at least one inner simple polygon.

In one embodiment, the geographic database 103 follows certain conventions. For example, links do not cross themselves and do not cross each other except at a node. Also, there are no duplicated shape points, nodes, or links. Two links that connect each other have a common node. In the geographic database 103, overlapping geographic features are represented by overlapping polygons. When polygons overlap, the boundary of one polygon crosses the boundary of the other polygon. In the geographic database 103, the location at which the boundary of one polygon intersects they boundary of another polygon is represented by a node. In one embodiment, a node may be used to represent other locations along the boundary of a polygon than a location at which the boundary of the polygon intersects the boundary of another polygon. In one embodiment, a shape point is not used to represent a point at which the boundary of a polygon intersects the boundary of another polygon.

As shown, the geographic database 103 includes node data records 703, road segment or link data records 705, POI data records 707, map embedding data records 709, HD mapping data records 711, and indexes 713, for example. More, fewer or different data records can be provided. In one embodiment, additional data records (not shown) can include cartographic ("carto") data records, routing data, and maneuver data. In one embodiment, the indexes 713 may improve the speed of data retrieval operations in the geographic database 103. In one embodiment, the indexes 713 may be used to quickly locate data without having to search every row in the geographic database 103 every time it is accessed. For example, in one embodiment, the indexes 713 can be a spatial index of the polygon points associated with stored feature polygons.

In exemplary embodiments, the road segment data records 705 are links or segments representing roads, streets, or paths, as can be used in the calculated route or recorded route information for determination of one or more personalized routes. The node data records 703 are end points corresponding to the respective links or segments of the road segment data records 705. The road link data records 705 and the node data records 703 represent a road network, such as used by vehicles, cars, and/or other entities. Alternatively, the geographic database 103 can contain path segment and node data records or other data that represent pedestrian paths or areas in addition to or instead of the vehicle road record data, for example.

The road/link segments and nodes can be associated with attributes, such as geographic coordinates, street names, address ranges, speed limits, turn restrictions at intersections, and other navigation related attributes, as well as POIs, such as gasoline stations, hotels, restaurants, museums, stadiums, offices, automobile dealerships, auto repair shops, buildings, stores, parks, etc. The geographic database 103 can include data about the POIs and their respective locations in the POI data records 707. The geographic database 103 can also include data about places, such as cities, towns, or other communities, and other geographic features, such as bodies of water, mountain ranges, etc. Such place or feature data can be part of the POI data records 707 or can be associated with POIs or POI data records 707 (such as a data point used for displaying or representing a position of a city).

In one embodiment, the geographic database 103 can also include map embedding data records 709 for storing extracted map features, map embedding layer parameters (e.g., size, loss function), map embedding layers, machine learning model parameters, and/or any other related data that is used or generated according to the embodiments described herein. By way of example, the map embedding data records 709 can be associated with one or more of the node records 703, road segment records 705, and/or POI data records 707 to associate the map embeddings with specific geographic areas or features. In this way, the map embedding data records 709 can also be associated with the characteristics or metadata of the corresponding records 703, 705, and/or 707.

In one embodiment, as discussed above, the HD mapping data records 711 model road surfaces and other map features to centimeter-level or better accuracy (e.g., including centimeter-level accuracy for ground truth objects used for visual odometry based on polyline homogeneity according to the embodiments described herein). The HD mapping data records 711 also include ground truth object models that provide the precise object geometry with polylines or polygonal boundaries, as well as rich attributes of the models. These rich attributes include, but are not limited to, object type, object location, lane traversal information, lane types, lane marking types, lane level speed limit information, and/or the like. In one embodiment, the HD mapping data records 711 are divided into spatial partitions of varying sizes to provide HD mapping data to end user devices with near real-time speed without overloading the available resources of the devices (e.g., computational, memory, bandwidth, etc. resources).

In one embodiment, the HD mapping data records 711 are created from high-resolution 3D mesh or point-cloud data generated, for instance, from LiDAR-equipped vehicles. The 3D mesh or point-cloud data are processed to create 3D representations of a street or geographic environment at centimeter-level accuracy for storage in the HD mapping data records 711.

In one embodiment, the HD mapping data records 711 also include real-time sensor data collected from probe vehicles in the field. The real-time sensor data, for instance, integrates real-time traffic information, weather, and road conditions (e.g., potholes, road friction, road wear, etc.) with highly detailed 3D representations of street and geographic features to provide precise real-time data (e.g., including probe trajectories) also at centimeter-level accuracy. Other sensor data can include vehicle telemetry or operational data such as windshield wiper activation state, braking state, steering angle, accelerator position, and/or the like.

In one embodiment, the geographic database 103 can be maintained by the content provider 125 in association with the services platform 117 (e.g., a map developer). The map developer can collect geographic data to generate and enhance the geographic database 103. There can be different ways used by the map developer to collect data. These ways can include obtaining data from other sources, such as municipalities or respective geographic authorities. In addition, the map developer can employ field personnel to travel by vehicle along roads throughout the geographic region to observe features and/or record information about them, for example. Also, remote sensing, such as aerial or satellite photography, can be used.

The geographic database 103 can be a master geographic database stored in a format that facilitates updating, maintenance, and development. For example, the master geographic database or data in the master geographic database can be in an Oracle spatial format or other spatial format, such as for development or production purposes. The Oracle spatial format or development/production database can be compiled into a delivery format, such as a geographic data files (GDF) format. The data in the production and/or delivery formats can be compiled or further compiled to form geographic database products or databases, which can be used in end user navigation devices or systems.

For example, geographic data is compiled (such as into a platform specification format (PSF)) to organize and/or configure the data for performing navigation-related functions and/or services, such as route calculation, route guidance, map display, speed calculation, distance and travel time functions, and other functions, by a navigation device, such as by a user device 121. The navigation-related functions can correspond to vehicle navigation, pedestrian navigation, or other types of navigation. The compilation to produce the end user databases can be performed by a party or entity separate from the map developer. For example, a customer of the map developer, such as a navigation device developer or other end user device developer, can perform compilation on a received geographic database in a delivery format to produce one or more compiled navigation databases.

The processes described herein for providing map embedding analytics may be advantageously implemented via software, hardware (e.g., general processor, Digital Signal Processing (DSP) chip, an Application Specific Integrated Circuit (ASIC), Field Programmable Gate Arrays (FPGAs), etc.), firmware or a combination thereof. Such exemplary hardware for performing the described functions is detailed below.

Figure 8:
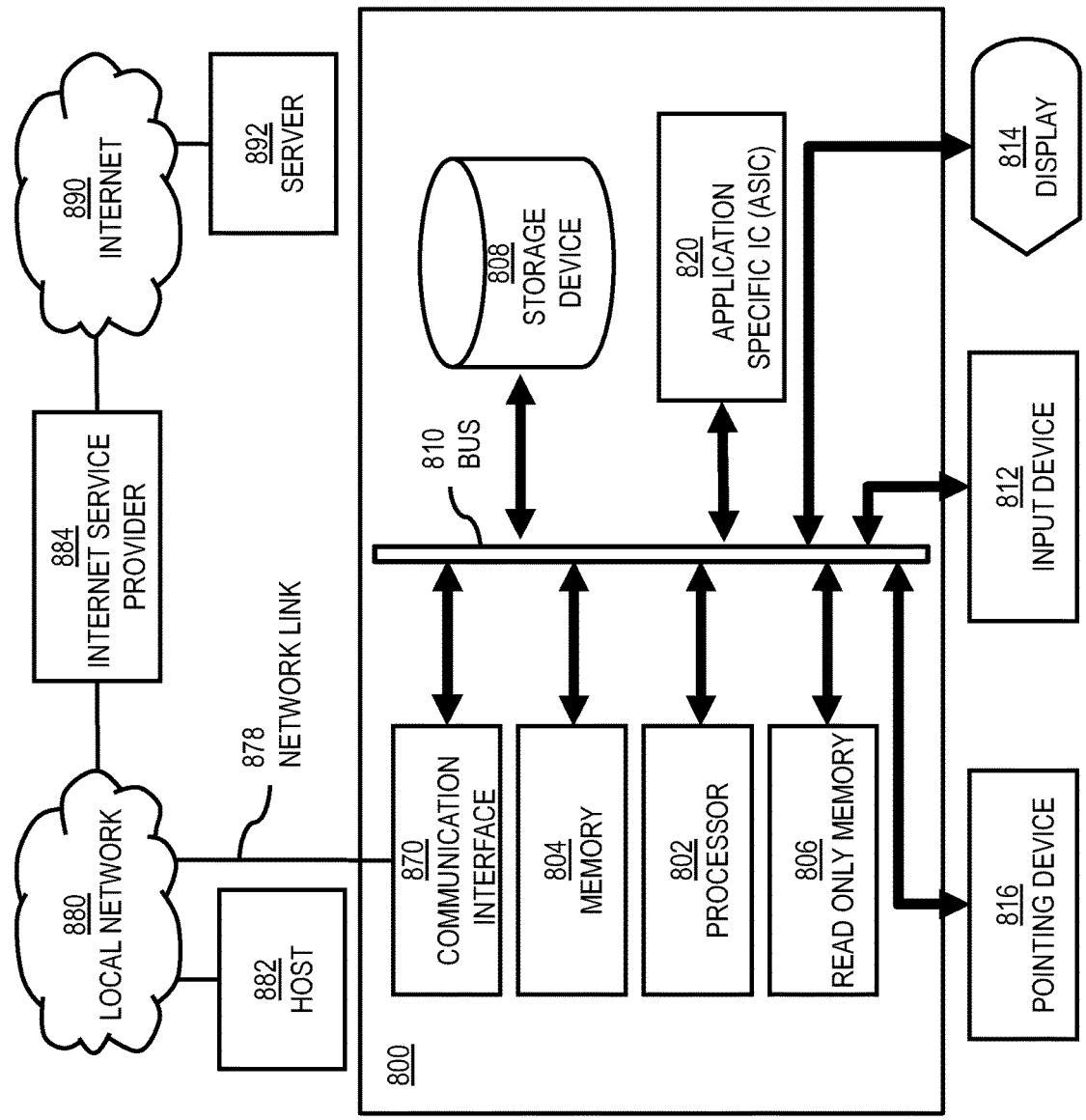
FIG. 8 is a diagram of hardware that can be used to implement an embodiment of the processes described herein.

FIG. 8 illustrates a computer system 800 upon which an embodiment of the invention may be implemented. Computer system 800 is programmed (e.g., via computer program code or instructions) to provide map embedding analytics as described herein and includes a communication mechanism such as a bus 810 for passing information between other internal and external components of the computer system 800. Information (also called data) is represented as a physical expression of a measurable phenomenon, typically electric voltages, but including, in other embodiments, such phenomena as magnetic, electromagnetic, pressure, chemical, biological, molecular, atomic, sub-atomic and quantum interactions. For example, north and south magnetic fields, or a zero and non-zero electric voltage, represent two states (0, 1) of a binary digit (bit). Other phenomena can represent digits of a higher base. A superposition of multiple simultaneous quantum states before measurement represents a quantum bit (qubit). A sequence of one or more digits constitutes digital data that is used to represent a number or code for a character. In some embodiments, information called analog data is represented by a near continuum of measurable values within a particular range.

A bus 810 includes one or more parallel conductors of information so that information is transferred quickly among devices coupled to the bus 810. One or more processors 802 for processing information are coupled with the bus 810.

A processor 802 performs a set of operations on information as specified by computer program code related to providing map embedding analytics. The computer program code is a set of instructions or statements providing instructions for the operation of the processor and/or the computer system to perform specified functions. The code, for example, may be written in a computer programming language that is compiled into a native instruction set of the processor. The code may also be written directly using the native instruction set (e.g., machine language). The set of operations include bringing information in from the bus 810 and placing information on the bus 810. The set of operations also typically include comparing two or more units of information, shifting positions of units of information, and combining two or more units of information, such as by addition or multiplication or logical operations like OR, exclusive OR (XOR), and AND. Each operation of the set of operations that can be performed by the processor is represented to the processor by information called instructions, such as an operation code of one or more digits. A sequence of operations to be executed by the processor 802, such as a sequence of operation codes, constitute processor instructions, also called computer system instructions or, simply, computer instructions. Processors may be implemented as mechanical, electrical, magnetic, optical, chemical or quantum components, among others, alone or in combination.

Computer system 800 also includes a memory 804 coupled to bus 810. The memory 804, such as a random access memory (RAM) or other dynamic storage device, stores information including processor instructions for providing map embedding analytics. Dynamic memory allows information stored therein to be changed by the computer system 800. RAM allows a unit of information stored at a location called a memory address to be stored and retrieved independently of information at neighboring addresses. The memory 804 is also used by the processor 802 to store temporary values during execution of processor instructions. The computer system 800 also includes a read only memory (ROM) 806 or other static storage device coupled to the bus 810 for storing static information, including instructions, that is not changed by the computer system 800. Some memory is composed of volatile storage that loses the information stored thereon when power is lost. Also coupled to bus 810 is a non-volatile (persistent) storage device 808, such as a magnetic disk, optical disk or flash card, for storing information, including instructions, that persists even when the computer system 800 is turned off or otherwise loses power.

Information, including instructions for providing map embedding analytics, is provided to the bus 810 for use by the processor from an external input device 812, such as a keyboard containing alphanumeric keys operated by a human user, or a sensor. A sensor detects conditions in its vicinity and transforms those detections into physical expression compatible with the measurable phenomenon used to represent information in computer system 800. Other external devices coupled to bus 810, used primarily for interacting with humans, include a display device 814, such as a cathode ray tube (CRT) or a liquid crystal display (LCD), or plasma screen or printer for presenting text or images, and a pointing device 816, such as a mouse or a trackball or cursor direction keys, or motion sensor, for controlling a position of a small cursor image presented on the display 814 and issuing commands associated with graphical elements presented on the display 814. In some embodiments, for example, in embodiments in which the computer system 800 performs all functions automatically without human input, one or more of external input device 812, display device 814 and pointing device 816 is omitted.

In the illustrated embodiment, special purpose hardware, such as an application specific integrated circuit (ASIC) 820, is coupled to bus 810. The special purpose hardware is configured to perform operations not performed by processor 802 quickly enough for special purposes. Examples of application specific ICs include graphics accelerator cards for generating images for display 814, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

Computer system 800 also includes one or more instances of a communications interface 870 coupled to bus 810. Communication interface 870 provides a one-way or two-way communication coupling to a variety of external devices that operate with their own processors, such as printers, scanners and external disks. In general the coupling is with a network link 878 that is connected to a local network 880 to which a variety of external devices with their own processors are connected. For example, communication interface 870 may be a parallel port or a serial port or a universal serial bus (USB) port on a personal computer. In some embodiments, communications interface 870 is an integrated services digital network (ISDN) card or a digital subscriber line (DSL) card or a telephone modem that provides an information communication connection to a corresponding type of telephone line. In some embodiments, a communication interface 870 is a cable modem that converts signals on bus 810 into signals for a communication connection over a coaxial cable or into optical signals for a communication connection over a fiber optic cable. As another example, communications interface 870 may be a local area network (LAN) card to provide a data communication connection to a compatible LAN, such as Ethernet. Wireless links may also be implemented. For wireless links, the communications interface 870 sends or receives or both sends and receives electrical, acoustic or electromagnetic signals, including infrared and optical signals, that carry information streams, such as digital data. For example, in wireless handheld devices, such as mobile telephones like cell phones, the communications interface 870 includes a radio band electromagnetic transmitter and receiver called a radio transceiver. In certain embodiments, the communications interface 870 enables connection to the communication network 115 for providing map embedding analytics.

The term computer-readable medium is used herein to refer to any medium that participates in providing information to processor 802, including instructions for execution. Such a medium may take many forms, including, but not limited to, non-volatile media, volatile media and transmission media. Non-volatile media include, for example, optical or magnetic disks, such as storage device 808. Volatile media include, for example, dynamic memory 804. Transmission media include, for example, coaxial cables, copper wire, fiber optic cables, and carrier waves that travel through space without wires or cables, such as acoustic waves and electromagnetic waves, including radio, optical and infrared waves. Signals include man-made transient variations in amplitude, frequency, phase, polarization or other physical properties transmitted through the transmission media. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, an EPROM, a FLASH-EPROM, any other memory chip or cartridge, a carrier wave, or any other medium from which a computer can read.

FIG. 9 illustrates a chip set 900 upon which an embodiment of the invention may be implemented. Chip set 900 is programmed to provide map embedding analytics as described herein and includes, for instance, the processor and memory components described with respect to FIG. 8 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set can be implemented in a single chip.

In one embodiment, the chip set 900 includes a communication mechanism such as a bus 901 for passing information among the components of the chip set 900. A processor 903 has connectivity to the bus 901 to execute instructions and process information stored in, for example, a memory 905. The processor 903 may include one or more processing cores with each core configured to perform independently. A multi-core processor enables multiprocessing within a single physical package. Examples of a multi-core processor include two, four, eight, or greater numbers of processing cores. Alternatively or in addition, the processor 903 may include one or more microprocessors configured in tandem via the bus 901 to enable independent execution of instructions, pipelining, and multithreading. The processor 903 may also be accompanied with one or more specialized components to perform certain processing functions and tasks such as one or more digital signal processors (DSP) 907, or one or more application-specific integrated circuits (ASIC) 909. A DSP 907 typically is configured to process real-world signals (e.g., sound) in real time independently of the processor 903. Similarly, an ASIC 909 can be configured to performed specialized functions not easily performed by a general purposed processor. Other specialized components to aid in performing the inventive functions described herein include one or more field programmable gate arrays (FPGA) (not shown), one or more controllers (not shown), or one or more other special-purpose computer chips.

The processor 903 and accompanying components have connectivity to the memory 905 via the bus 901. The memory 905 includes both dynamic memory (e.g., RAM, magnetic disk, writable optical disk, etc.) and static memory (e.g., ROM, CD-ROM, etc.) for storing executable instructions that when executed perform the inventive steps described herein to provide map embedding analytics. The memory 905 also stores the data associated with or generated by the execution of the inventive steps.

Figure 10:
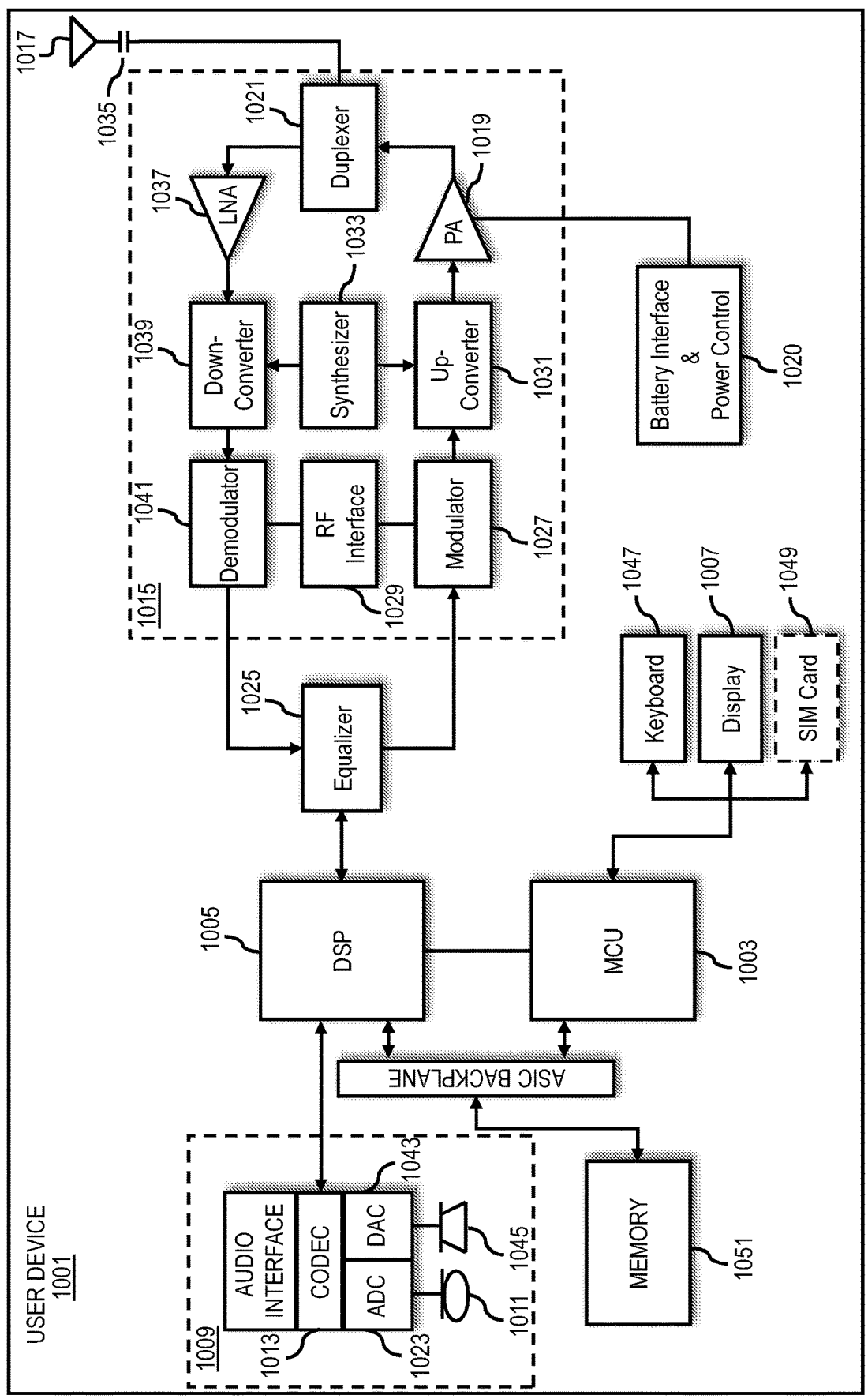
FIG. 10 is a diagram of a terminal that can be used to implement an embodiment of the processes described herein.

FIG. 10 is a diagram of exemplary components of a user device 1001 (e.g., a user device 121) capable of operating in the system of FIG. 1, according to one embodiment. Generally, a radio receiver is often defined in terms of front-end and back-end characteristics. The front-end of the receiver encompasses all of the Radio Frequency (RF) circuitry whereas the back-end encompasses all of the base-band processing circuitry. Pertinent internal components of the telephone include a Main Control Unit (MCU) 1003, a Digital Signal Processor (DSP) 1005, and a receiver/transmitter unit including a microphone gain control unit and a speaker gain control unit. A main display unit 1007 provides a display to the user in support of various applications and mobile station functions that offer automatic contact matching. An audio function circuitry 1009 includes a microphone 1011 and microphone amplifier that amplifies the speech signal output from the microphone 1011. The amplified speech signal output from the microphone 1011 is fed to a coder/decoder (CODEC) 1013.

A radio section 1015 amplifies power and converts frequency in order to communicate with a base station, which is included in a mobile communication system, via antenna 1017. The power amplifier (PA) 1019 and the transmitter/modulation circuitry are operationally responsive to the MCU 1003, with an output from the PA 1019 coupled to the duplexer 1021 or circulator or antenna switch, as known in the art. The PA 1019 also couples to a battery interface and power control unit 1020.

In use, a user of user device 1001 speaks into the microphone 1011 and his or her voice along with any detected background noise is converted into an analog voltage. The analog voltage is then converted into a digital signal through the Analog to Digital Converter (ADC) 1023. The control unit 1003 routes the digital signal into the DSP 1005 for processing therein, such as speech encoding, channel encoding, encrypting, and interleaving. In one embodiment, the processed voice signals are encoded, by units not separately shown, using a cellular transmission protocol such as global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., microwave access (WiMAX), Long Term Evolution (LTE) networks, code division multiple access (CDMA), wireless fidelity (WiFi), satellite, and the like.

The encoded signals are then routed to an equalizer 1025 for compensation of any frequency-dependent impairments that occur during transmission though the air such as phase and amplitude distortion. After equalizing the bit stream, the modulator 1027 combines the signal with a RF signal generated in the RF interface 1029. The modulator 1027 generates a sine wave by way of frequency or phase modulation. In order to prepare the signal for transmission, an up-converter 1031 combines the sine wave output from the modulator 1027 with another sine wave generated by a synthesizer 1033 to achieve the desired frequency of transmission. The signal is then sent through a PA 1019 to increase the signal to an appropriate power level. In practical systems, the PA 1019 acts as a variable gain amplifier whose gain is controlled by the DSP 1005 from information received from a network base station. The signal is then filtered within the duplexer 1021 and optionally sent to an antenna coupler 1035 to match impedances to provide maximum power transfer. Finally, the signal is transmitted via antenna 1017 to a local base station. An automatic gain control (AGC) can be supplied to control the gain of the final stages of the receiver. The signals may be forwarded from there to a remote telephone which may be another cellular telephone, other mobile phone or a land-line connected to a Public Switched Telephone Network (PSTN), or other telephony networks.

Voice signals transmitted to the user device 1001 are received via antenna 1017 and immediately amplified by a low noise amplifier (LNA) 1037. A down-converter 1039 lowers the carrier frequency while the demodulator 1041 strips away the RF leaving only a digital bit stream. The signal then goes through the equalizer 1025 and is processed by the DSP 1005. A Digital to Analog Converter (DAC) 1043 converts the signal and the resulting output is transmitted to the user through the speaker 1045, all under control of a Main Control Unit (MCU) 1003—which can be implemented as a Central Processing Unit (CPU) (not shown).

The MCU 1003 receives various signals including input signals from the keyboard 1047. The keyboard 1047 and/or the MCU 1003 in combination with other user input components (e.g., the microphone 1011) comprise a user interface circuitry for managing user input. The MCU 1003 runs a user interface software to facilitate user control of at least some functions of the user device 1001 to provide map embedding analytics. The MCU 1003 also delivers a display command and a switch command to the display 1007 and to the speech output switching controller, respectively. Further, the MCU 1003 exchanges information with the DSP 1005 and can access an optionally incorporated SIM card 1049 and a memory 1051. In addition, the MCU 1003 executes various control functions required of the station. The DSP 1005 may, depending upon the implementation, perform any of a variety of conventional digital processing functions on the voice signals. Additionally, DSP 1005 determines the background noise level of the local environment from the signals detected by microphone 1011 and sets the gain of microphone 1011 to a level selected to compensate for the natural tendency of the user of the user device 1001.

The CODEC 1013 includes the ADC 1023 and DAC 1043. The memory 1051 stores various data including call incoming tone data and is capable of storing other data including music data received via, e.g., the global Internet. The software module could reside in RAM memory, flash memory, registers, or any other form of writable computer-readable storage medium known in the art including non-transitory computer-readable storage medium. For example, the memory device 1051 may be, but not limited to, a single memory, CD, DVD, ROM, RAM, EEPROM, optical storage, or any other non-volatile or non-transitory storage medium capable of storing digital data.

An optionally incorporated SIM card 1049 carries, for instance, important information, such as the cellular phone number, the carrier supplying service, subscription details, and security information. The SIM card 1049 serves primarily to identify the user device 1001 on a radio network. The card 1049 also contains a memory for storing a personal telephone number registry, text messages, and user specific mobile station settings.

While the invention has been described in connection with a number of embodiments and implementations, the invention is not so limited but covers various obvious modifications and equivalent arrangements, which fall within the purview of the appended claims. Although features of the invention are expressed in certain combinations among the claims, it is contemplated that these features can be arranged in any combination and order.

What is claimed is:

1. A computer-implemented method for providing map embedding analytics for a neural network comprising:
processing map data to extract one or more map features;
training a first neural network to predict an embedding layer, wherein the first neural network is trained using the one or more extracted map features;
generating the embedding layer using the first neural network, wherein the embedding layer represents a semantic relationship among the one or more map features;
providing the embedding layer as an output for embedding into a second neural network; and
training the second neural network to perform one or more map-related predictions with respect to image data after the embedding layer is inserted.

2. The method of claim 1,
wherein the one or more map features include one or more map attribute categories, and wherein the one or more map attribute categories are predicted in the embedding layer as one or more vectors, and
wherein the trained first neural network processes the map data to maximize a distance between the predicted one or more vectors in the embedding layer.

3. The method of claim 1, wherein the second neural network is trained to classify a relationship between one or more map attributes after the embedding layer is incorporated into the second neural network.

4. The method of claim 1, wherein the first neural network is pre-trained before a training of the second neural network.

5. The method of claim 1, wherein the first neural network is co-trained with a training of the second neural network.

6. The method of claim 5, wherein the first neural network is trained to predict the embedding layer using the map data in combination with input data for training the second neural network.

7. The method of claim 1, wherein the first neural network is a combination of a convolutional neural network and a recurrent neural network, and wherein the convolutional neural network is trained to predict the embedding layer with respect to point data of a pathway and the recurrent neural network is trained to predict the embedding layer with respect to the pathway.

8. The method of claim 7, wherein the convolutional neural network and the recurrent neural network are trained to predict a same value per a type of the pathway.

9. The method of claim 1, wherein the one or more map features are predicted in the embedding layer using a multi-dimensional representation.

10. The method of claim 9, wherein the multi-dimensional representation includes a first vector representing a map feature and a second vector representing an attribute of the map feature.

11. The method of claim 1, further comprising: receiving an input specifying a size, a loss function, or a combination thereof for the embedding layer.

12. The method of claim 1, wherein the first neural network is independent from the second neural network.

13. An apparatus for providing map embedding analytics for a neural network, comprising:
at least one processor; and
at least one memory including computer program code for one or more programs,
the at least one memory and the computer program code configured to, within the at least one processor, cause the apparatus to perform at least the following,
process map data to extract one or more map features;
retrieve an embedding layer, wherein a first neural network is trained using the one or more extracted map features to predict the embedding layer, and wherein the embedding layer represents a semantic relationship among the one or more map features;
incorporate the embedding layer into a second neural network; and
train the second neural network to make map-related predictions with respect to image data after the embedding layer is incorporated.

14. The apparatus of claim 13, wherein the one or more map features are predicted in the embedding layer as one or more vectors, and wherein the first neural network processes a geographic database to maximize a distance between the predicted one or more vectors in the embedding layer.

15. The apparatus of claim 13, wherein the map-related predictions of the second neural network classify a relationship between one or more map attributes.

16. The apparatus of claim 13, wherein the first neural network is pre-trained, co-trained, or a combination thereof with respect to the training of the second neural network.

17. A non-transitory computer-readable storage medium for providing map embedding analytics for a neural network, carrying one or more sequences of one or more instructions which, when executed by one or more processors, cause an apparatus to perform:
processing map data to extract one or more map features;
training a neural network to predict an embedding layer and one or more other predictions based on the embedding layer, wherein the neural network is trained to predict the embedding layer using the one or more extracted map features and to predict the one or more other predictions using other training data;
generating the embedding layer using the neural network, wherein the embedding layer represents a semantic relationship among the one or more map features;
incorporating the embedding layer into a second neural network; and
training the second neural network to perform one or more map-related predictions with respect to image data after the embedding layer is inserted.

18. The non-transitory computer-readable storage medium of claim 17, wherein the one or more map features are predicted in the embedding layer as one or more vectors.

19. The non-transitory computer-readable storage medium of claim 18, wherein the trained neural network processes the map data to maximize a distance between the predicted one or more vectors in the embedding layer.

20. The non-transitory computer-readable storage medium of claim 17, wherein the one or more other predictions of the neural network is based on classifying a relationship between one or more map attributes.

* * * * *